United States Patent [19]

van der Lely

[11] 4,245,704
[45] Jan. 20, 1981

[54] SOIL CULTIVATING MACHINE

[76] Inventor: Cornelis van der Lely, 7, Brüschenrain, Zug, Switzerland

[21] Appl. No.: 964,882

[22] Filed: Nov. 30, 1978

[30] Foreign Application Priority Data

Nov. 30, 1977 [NL] Netherlands ............ 7713198
May 23, 1978 [NL] Netherlands ............ 7805544

[51] Int. Cl.³ .............................. A01B 3/76
[52] U.S. Cl. ........................ 172/49; 172/57
[58] Field of Search ............ 172/59, 49, 125, 111, 172/57, 52

[56] References Cited

U.S. PATENT DOCUMENTS

| 1,561,978 | 11/1925 | Garcia | 172/125 |
| 2,918,130 | 12/1959 | Thom | 172/59 X |
| 2,992,689 | 7/1961 | Laughlin | 172/16 |
| 3,108,645 | 10/1963 | Hill | 172/59 X |
| 3,367,425 | 2/1968 | Heeren | 172/59 X |
| 3,616,862 | 11/1971 | Lely | 172/59 |
| 4,029,153 | 6/1977 | Lely | 172/68 |
| 4,148,364 | 4/1979 | Scharmann | 172/59 X |

FOREIGN PATENT DOCUMENTS 7509003  1/1976  France ............ 172/59

Primary Examiner—Richard J. Johnson
Attorney, Agent, or Firm—Mason, Mason and Albright; William B. Mason

[57] ABSTRACT

A cultivating machine has a hollow frame portion supporting a row of rotating members each of which includes a lower plate-like tine that is S-shaped in cross section. The tines are connected to upper shafts that extend upwardly and forwardly at inclined angles. Each tine has two elongated soil cultivating elements with front ends that engage the soil. The members are mounted in a transverse row and can be spaced apart from one another so that the distance between two neighboring members is greater than one third of the diameter of the working path of each member so that furrows are formed. The upper shaft ends mount pinions that can be in mesh with one another or an intermediate pinion within the frame portion so that neighboring shafts can be driven in the same or opposite directions. One of the shafts is extended up through the frame portion to a gear box housing a driven pinion engaged by a driving pinion on an input shaft. The input shaft is connectable to the p.t.o. of a tractor. A supporting roller is pivoted to the frame and setable in any one of a plurality of positions to regulate the working depths of the members. Alternatively, a front spray boom with nozzles and a rear set of seed drills can be attached to the frame.

10 Claims, 9 Drawing Figures

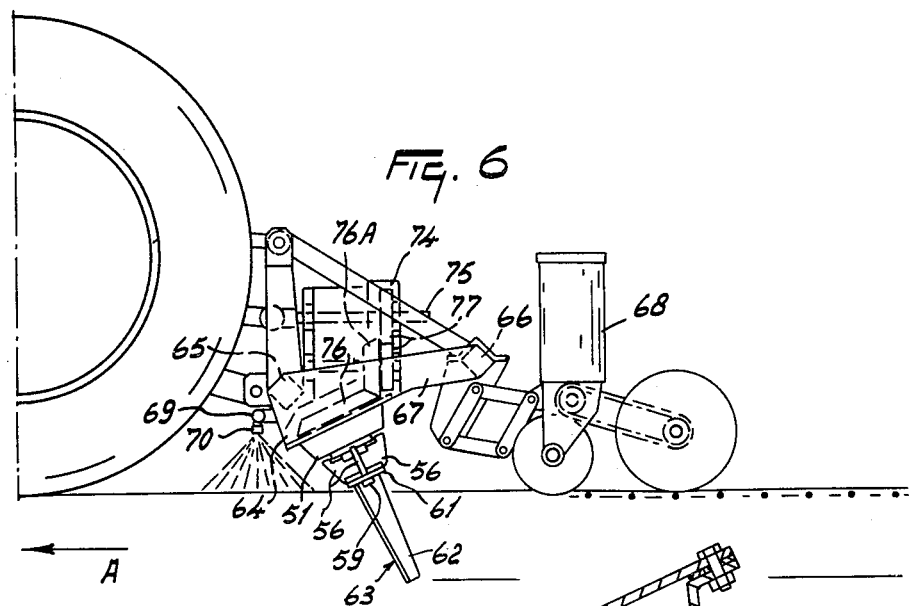
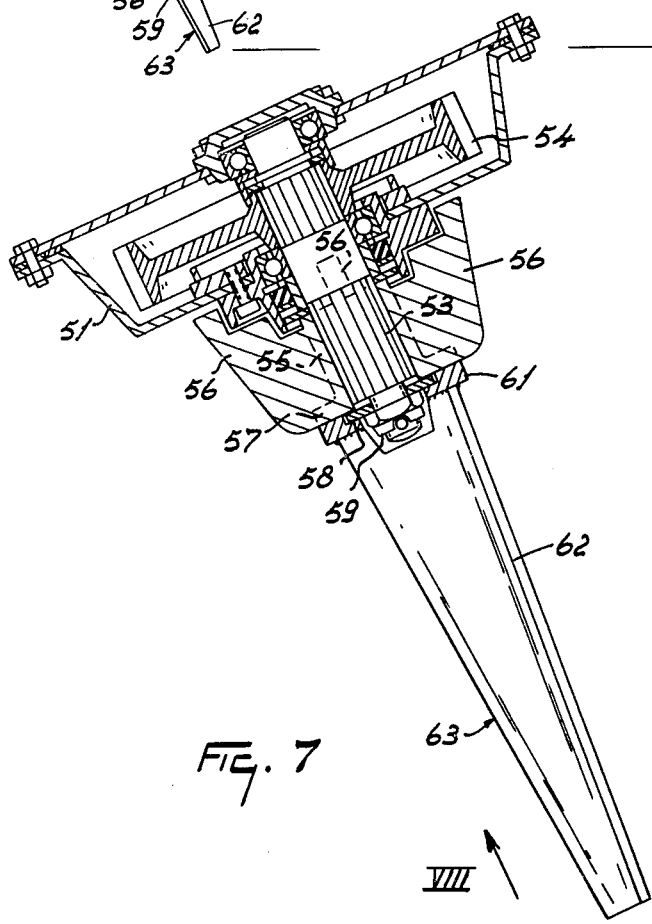

SOIL CULTIVATING MACHINE

The invention relates to a soil cultivating machine comprising a frame and a plurality of cultivating members journalled in said frame and adapted to rotate about upwardly extending shafts and provided with at least one soil cultivating element.

With machines of the kind set forth it has been found that in general a comparatively high power is required, since during operation a comparatively large quantity of earth is displaced.

By the construction according to the invention the required power can be reduced since a cultivating member comprises two soil cultivating elements, which work the soil by their front ends, with respect to the direction of rotation of a cultivating member and which are interconnected on their rear sides with respect to the direction of rotation.

For a better understanding of the invention and to show how the same may be carried into effect, reference will be made by way of example to the accompanying drawing.

FIG. 6 is a side elevation of the machine shown in FIG. 5.

FIG. 7 is an enlarged elevational view taken on the line VII—VII in FIG. 5.

Figure 1:
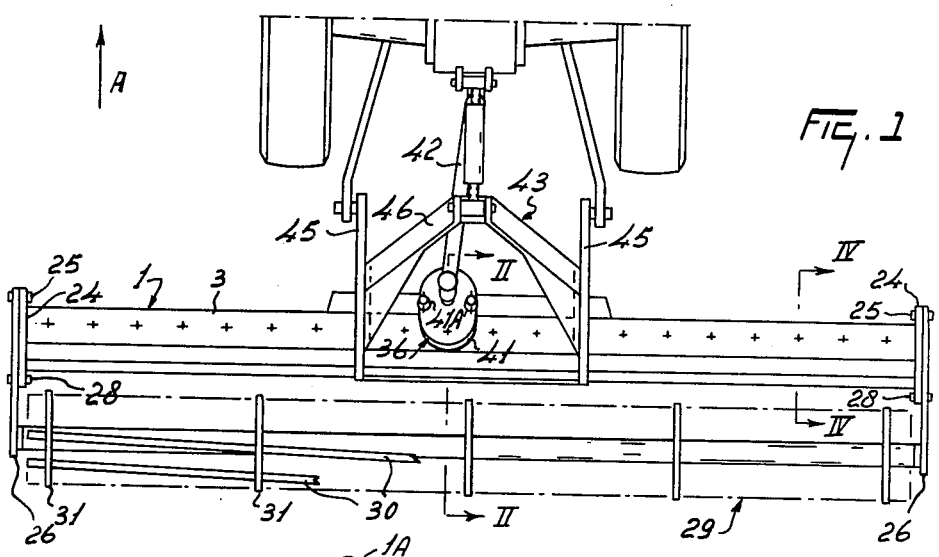
FIG. 1 is a plan view of a soil cultivating machine in accordance with the invention.
Figure 3:
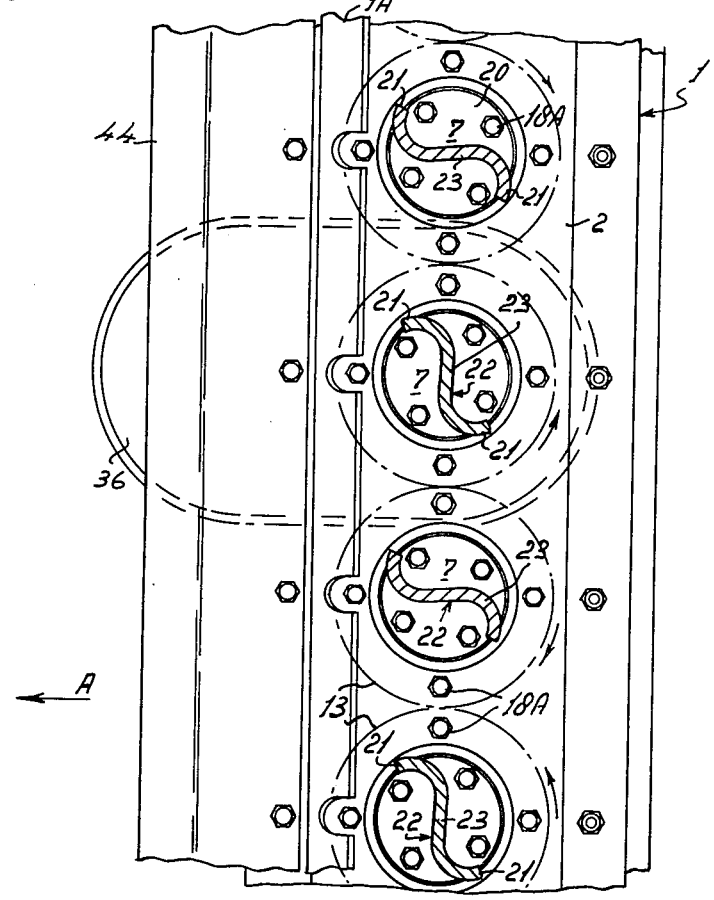
FIG. 3 is an elevational view taken on the line III—III in FIG. 2.
Figure 2:
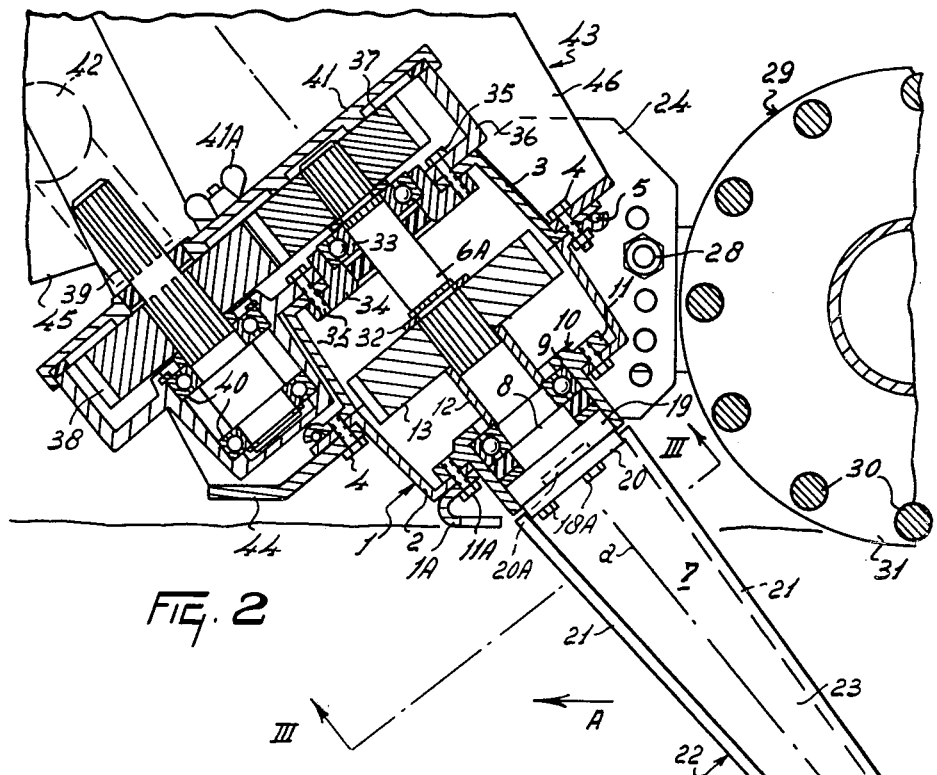
FIG. 2 is an enlarged elevational view taken on the line II—II in FIG. 1.
Figure 4:
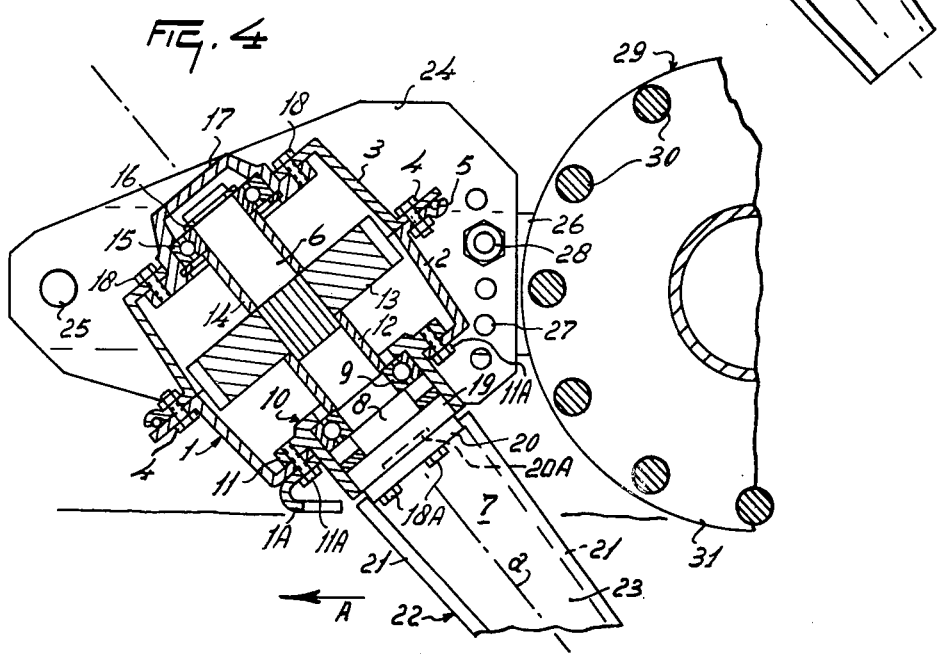
FIG. 4 is an elevational view taken on the line IV—IV in FIG. 1.

The device shown in FIGS. 1 to 4 is a soil cultivating machine comprising a box-shaped frame portion 1 extending transversely of the direction of movement A of the machine. The box-shaped frame portion 1 is formed by two identical parts 2 and 3, which are formed by profiling the same piece of sheet material. The parts 2 and 3, each of which has a U-shaped cross-section, have bent-over rims by means of which they are clamped together with the aid of bolts 4. Each of the parts 2 and 3 has a rim having an embossed part extending in the direction of length of the rim and adapted to receive packing material 5. Inside the box-shaped frame portion upwardly extending shafts 6 and 6A of cultivating members 7 are journalled at equal distances of preferably 15 cms. The frame portion 1 (see FIG. 1) occupies such a position that the forwardly inclined center line a of the shafts 6 and 6A are at an angle of 30° to 40° to the horizontal. Each of the shafts 6 and 6A is provided near the lower end with a shoulder 8 holding a ball bearing 9 surrounding the shaft. The ball bearing 9 is arranged in a bearing housing 10, which extends downwards beyond the lower end of a shaft 6 and 6A respectively. The bearing housing 10 is provided near its top end with a flange 11, which is fixed by means of screw bolts 11A in the box-shaped frame portion. A shaft 6 and 6A is surrounded by a sleeve 12 bearing on the top side of the ball bearing 9 and holding a pinion 13 fixed by key eays to the shaft. The pinions 13 on adjacent shafts are drivably in mesh with one another. With the exception of the shaft 6A located near the center of the box-shaped frame portion 1, each of the shafts is surrounded by a sleeve 14, which bears at the top on the pinion 13 (FIG. 4). The top side of the sleeve 14 supports a ball bearing 15 surrounding the shaft and being guarded by means of a locking ring 16. The ball bearing 15 is arranged in a bearing housing 17 located in a corresponding opening in the upper part 3 of the box-shaped frame portion 1. The bearing housing 17 is fixed in place by means of screw bolts 18, which can be inserted from the outside. Each of the shafts 6 and the shaft 6A of a cultivating member 7 is provided on the lower side with a supporting part 19 joining the shoulder 8 and being located (see FIGS. 2 and 4) completely within the downwardly extending part of the bearing housing 10 and being provided with a centering opening. The supporting part 19 has a circular shape, viewed in the direction of a shaft 6 and 6A respectively and has a fastening portion 20 connected by means of bolts 18A and on the top side of two interconnected cultivating elements 21 formed from a single sheet of material. The fastening portion 20 comprises a centering member 20A fitting in the centering opening of the supporting part 19, the shape of said portion also being circular. The diameter of the fastening portion substantially corresponds with the diameter of the circular supporting part 19 of a shaft 6 and 6A respectively. The soil cultivating elements 21 are formed by the bent-over longitudinal rims of a downwardly tapering, plate-shaped tine 22, which has an S-shaped cross-section, viewed in the direction of a shaft 6 and 6A respectively so that during operation two cultivating elements are directed to the front with respect to the direction of rotation of a cultivating member and are interconnected on their rear sides, with respect to the direction of rotation. The cultivating elements 21 are located at at least substantially equal distances from the longitudinal center line of the plate-shaped part, said longitudinal center line coinciding with the rotary axis a of a cultivating member 7. The plate-shaped tines 22 comprising the cultivating elements 21 of neighbouring cultivating members 7 are disposed so that the at least substantially straight connecting parts 23 between two cultivating elements 21 are at right angles to one another, if one of the connecting parts extending in the direction of movement A of the machine. The curved rims forming the cultivating elements 21 are at least substantially at right angles to the connecting part 23 and extend towards the free end at least substantially in the direction of rotation of the cultivating member 7. The working width of the cultivating elements 21 is about 10 cms. At the ends the box-shaped frame portion 1 is provided with sector-shaped plates 24 having at the front a stub shaft 25, about which an arm 26 can be set in a plurality of positions with the aid of holes 27 in the rear part of the plate 24 and of a bolt 28 which can also be passed through a hole in the arm. Between the rear ends of the arms 26 a roller 29 is freely rotatable; at the circumference it is provided with rod-shaped elements 30 extending in the direction of length of the roller and being supported by equidistant circular supports 31. From FIG. 2 is will be seen that the roller 29 is located at least substantially perpendicularly above the free end of a plate-shaped tine 22 of a cultivating member 7. On the shaft 6A near the center of the frame portion 1 a pinion 13 is fixed in place by means of a circlip 32 (FIG. 2). The top end of the shaft 6 is surrounded by a ball bearing 23 arranged in a housing 34, which is mounted by means of bolts 35 in an opening in the upper part 3 of the box-shaped portion 1. Each of the shafts 6 together with the bearing 9, the bearing housing 10, the pinion 13, the bearing 15 and the bearing housing 17 can be fastened as a prefabricated unit by means of the screw bolts 11A and 18 to be inserted from the outside. (FIGS. 2 and 4). With respect to the shaft 6A located near the center the unit of this shaft, the bearing 9, the bearing housing 10 and the pinion 13 can also be prefabricated as a separate unit. From FIG. 2 it will be apparent that the shaft 6A is prolonged upwardly into a gear box 36, which is fastened by means of the bolts 35 to the top side of the box-shaped frame portion 1. Inside the gear box 36 the shaft 6A is provided with an exchangeable pinion 37, which is drivably in mesh with an exchangeable pinion 38 on a shaft 39, the lower end of which is supported in two relatively spaced ball bearings 40 in the gear box 36. The shaft 39 extends out of a cover 41 arranged on the top side of the gear box 36 and being readily detachable by means of wing nuts and the end projecting from the gear box has key ways by which the shaft can be directly coupled with the power take-off shaft of a tractor via an auxiliary shaft 42. After the removal of the cover 41, by replacing the pinions 37 and 38 by other pinions a different speed can be obtained for the respective cultivating members 7.

Near the center the box-shaped frame portion 1 is provided with a trestle 43, which is inclined to the front away from the box-shaped frame portion. The trestle 43 is provided with a plate 44 extending transversely of the direction of movement A of the machine and being fastened to the front of the box-shaped frame portion with the aid of the bolts 4 clamping the parts 2 and 3 of the frame portion 1 against one another. By an upwardly curved part said plate forms a screen for that part of the gear box 36 in which the shaft 39 to be driven is journalled.

The trestle 43 is furthermore provided with plates 45 extending in the direction of movement of the machine to the proximity of the rear side of the box-shaped frame portion 1, while supporting plates 46 on the rear side of the trestle being fastened to said plates 45. The front sides of the plates 45 can be connected with the lower arms of the three-point lifting device of the tractor.

The machine described in the foregoing operates as follows:

The trestle 43 is connected with the three-point lift of the tractor and the shaft 39 is directly connected with the power take-off shaft of the tractor via the auxiliary shaft 42, while the cultivating members 7 are rotated in the directions indicated by arrows in FIG. 3 through the changespeed gear formed by the exchangeable pinions 37 and 38 in the gear box 36 and via the pinions 13 on the shafts 6 and 6A. Neighboring cultivating members 7 are thus rotating in opposite senses. During this rotation the earth is worked by the forwardly directed, relatively spaced cultivating elements 21 of a plate-shaped tine and guided along the connecting part 23 between the cultivating elements and delivered on the top side of the forwardly inclined cultivating members. The cultivating elements 21 have such a working range that the strips of soil located between the paths described by the cultivating elements are also worked so that the soil is tilled over the whole width of the machine. At the front the lower part 12 of the frame portion 1 is provided with a screen 1A extending in front of the fastening portions 19 (FIGS. 2 and 4). In a side view the screen has the shape of a V and fastened by means of the bolts 11A. Although in this embodiment the shafts of the cultivating members are at an angle of 30° to 40°, they may be at any angle between 0° and 90° to the horizontal. With the aid of the change-speed gear formed by the exchangeable pinions 37 and 38 arranged between the shaft 39 directly driven by the power take-off shaft of the tractor and the shaft 6A of a cultivating member 7 located near the center of the frame portion the speed of the respective cultivating members can be varied at will in an effective manner. The distance between two neighboring cultivating members exceeds one third of the diameter of the path described by the soil cultivating elements. In this way, it is possible to work a strip of soil over substantially the whole width of the machine by a minimum amount of power. The working depth of the respective cultivating members 7 can be adjusted with the aid of the roller 29 located on the rear side and being located, as stated above, at least substantially perpendicularly above the free end of a plate-shaped tine of a cultivating member. It is thus ensured that the cultivating members work the soil as far as beneath the roller, so that in an effective manner a counter-pressure is obtained by which crumbling, particularly of heavy, wet soil can be performed more effectively.

FIGS. 5 to 9 show a machine comprising cultivating members substantially corresponding with those of the first embodiment, said machine being combined with a device for introducing growth stimulators and seed or seedlings into the soil in relatively spaced rows.

The machine comprises a box-shaped frame portion 1 extending transversely of the direction of movement A of the machine and holding upwardly extending shafts 52 and 53 at equal distances of preferably 25 cms. Each of the shafts 52 and 53 is provided inside the box-shaped frame portion 51 with a spur pinion 54 so that the pinions on neighboring shafts are drivably in mesh with one another.

Figure 5:
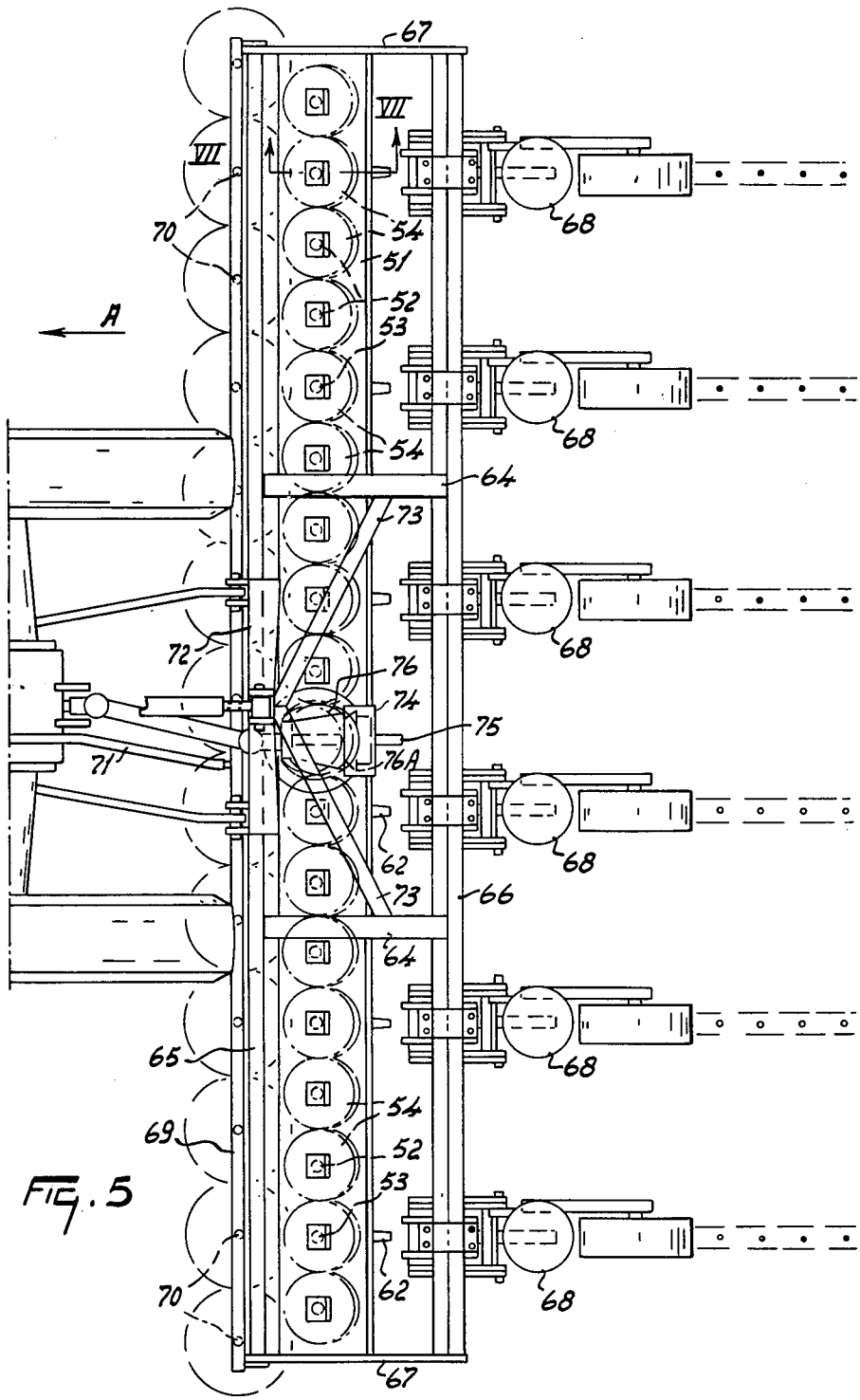
FIG. 5 is a plan view of a second embodiment of a soil cultivating machine in accordance with the invention.
Figure 8:
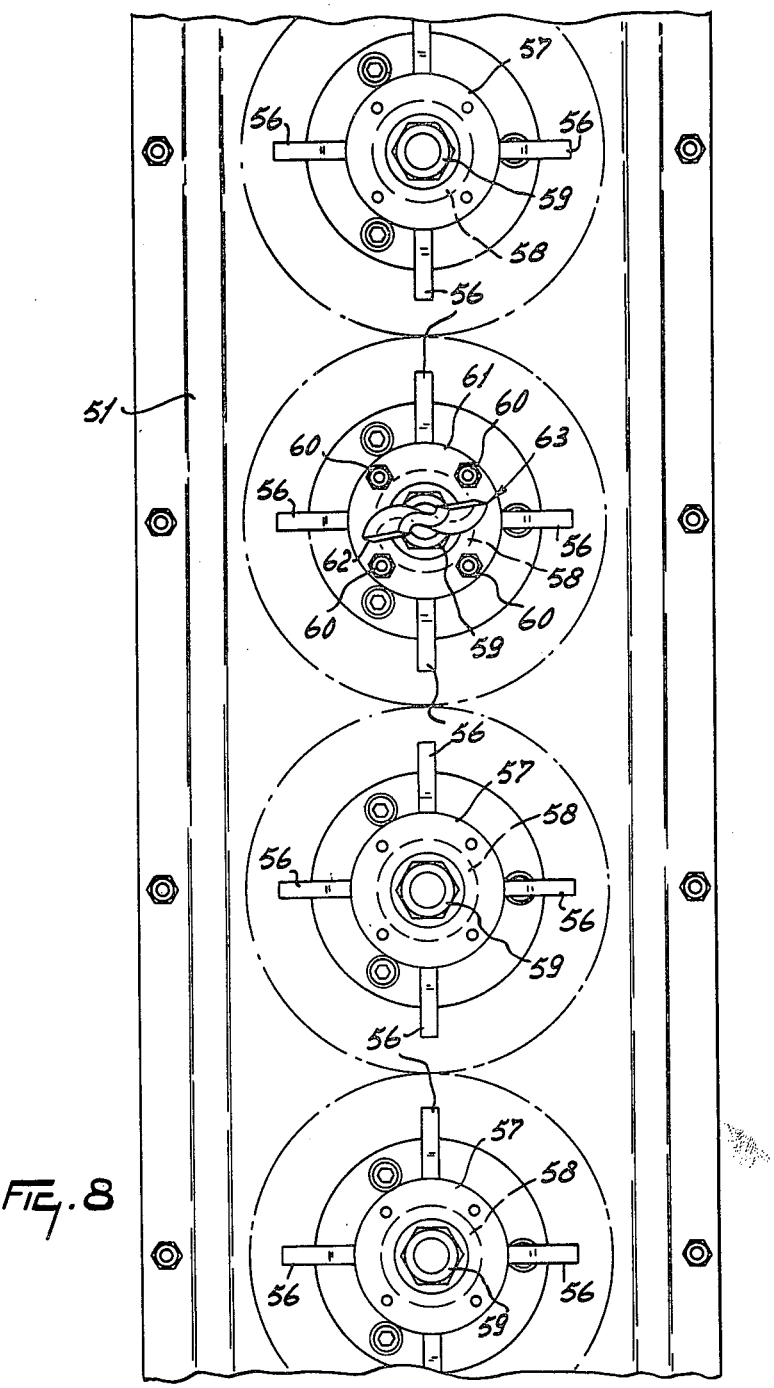
FIG. 8 is an elevational view in the direction of the arrow VIII in FIG. 7.

In the embodiment shown in FIG. 5 the shafts 53 are spaced apart by a distance of about 75 cms project from the bottom side of the box-shaped frame portion 51 (FIG. 6). The lower ends of the shafts 53 have key ways for fastening a sleeve 55 provided with cross-wise arranged wings 56. The wings 56 are provided at the top with a recess ascending stepwise from the interior to the outer side so that the top sides of the wings extend substantially up to the bottom of the box-shaped frame portion 51 and to the bearings of the shafts in the bearing housings on the bottom side of the box-shaped frame portion. Each sleeve 55 is provided on the lower side with a flange 57, which is in engagement with a locking plate 58, which is held in place by means of a nut 59 co-opearing with screwthread at the lower end of the shaft. The flange 57 is provided with holes located between the wings 56 for passing bolts 60 with the aid of which a plate-shaped fastening portion 61 of a tool 62 is secured to the flange. The shafts 53 with the tools 62 constitute cultivating members 63. Each tool 62 is constructed from sheet material in the form of a tine, which tapers towards its free end. The plate is curved so that it has an S-shaped cross-section so that invariably one rim forming a cultivating element is located at the front side with respect to the direction of rotation of a cultivating member 63. The box-shaped frame portion 51 is provided on the top side on either side of the center with beams 64 extending in the direction of movement A and supporting on the front and rear sides frame beams 65 and 66 extending transversely of the direction of movement. The frame beams 65 and 66, having an angular cross-section, are disposed so that the foremost frame beam 65 is at a slightly lower level than the hindmost frame beam 66. The free ends of the frame beams 65 and 66 and the ends of the box-shaped frame portion 51 are interconnected by upwardly extending plates 67, which close at the same time the ends of the box-shaped frame portion. From the figure it is apparent that the box-shaped frame portion 41 is fastened so that during operation the shafts of the respective cultivatint members 63 are inclined forwardly at an angle of about 75° to to the horizontal. Behind each of the cultivating members 63 the hindmost frame beam 66 if provided with a precision seed drill element 68 of known type. At the front of the foremost frame beam 65 a spraying boom 69 is arranged over the whold length of said beam and parallel thereto, said boom being provided at the level of the cultivating members 63 with downwardly directed spray nozzles 70. Near the center the spraying boom 69 is connected with a conduit 71, which communicates in a manner not shown with a reservoir, from where material can be fed through the boom to the spray nozzles. Near the center the foremost frame beam 65 is provided with a trestle 72 for attaching the machine to the three-point lifting device of a tractor. The top side of the trestle 72 is connected by downwardly diverging struts 73 with the beams 64 extending in the direction of movement. Near the center a shaft 52 located between the shafts 53 of two cultivating members 63 is prolonged upwardly into a gear box 74, in which this shaft is linked through a bevel pinion and a spur pinion transmission 76, 76A and 77 respectively to an at least substantially horizontal shaft 75 extending in the direction of movement A and projecting both from the front and rear side of the gear box. The front end of said shaft can be coupled through an auxiliary shaft with the power take-off of the tractor, whereas the rear end of the shaft may serve for driving a tool to be combined with the machine.

During operation the machine, attached by the trestle 72 to the three-point lift of the tractor, is moved in the direction of the arrow A, the respective cultivating members 63 are driven through the transmission gear described above in the direction indicated by arrows in FIG. 5. The cultivating elements 62 of the cultivating members rotating in the same sense make a furrow in the soil after a growth stimulator is spread by the spray nozzles on the soil, in which furrows seed can be deposited from the seed drill mechanisms 68, after which the furrow is closed by a pressing wheel provided shown the machine is suitable for introducing growth stimulating substances and/or insecticides and herbicides together with seeds in rows spaced apart by about 75 cms into the soil, the respective cultivating members 63 make a furrow in the soil for receiving the seeds by means of their plate-shaped, S-curved tool forming a tine, which is at an angle of about 75° to the horizontal during operation.

Figure 9:
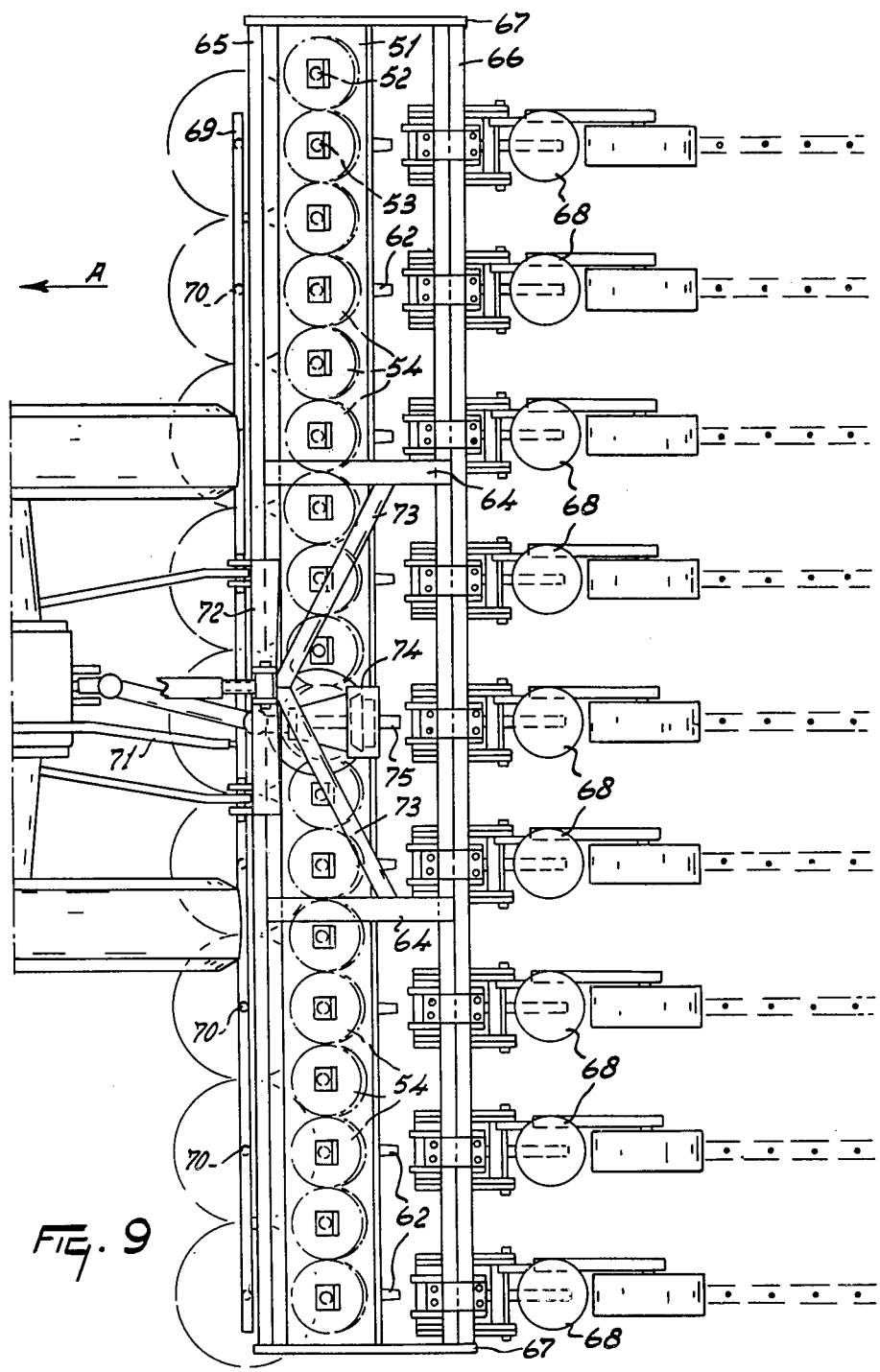
FIG. 9 is a plan view of a third embodiment of a machine in accordance with the invention.

The third embodiment shown in FIG. 9 substantially corresponds structurally with the machine in the above described embodiment. Corresponding parts are, therefore, designated by the same reference numerals. The difference between this embodiment and the preceding embodiment resides in that a larger number of shafts 53 is journalled in the box-shaped frame portion and that these shafts are spaced apart by a distance of about 50 cms. Also in this embodiment a spray nozzle 70 is provided in front of each cultivating member 63 and behind each of them a sowing mechanism 68 is provided. During operation the respective cultivating members 63 rotate in the directions indicated by arrows in the figure. Also in this embodiment the cultivating members 63 rotate in the same sense, like in the preceding embodiment the tools 62 make a furrow in the soil for receiving the seeds emanating from the respective sowing mechanisms 68. The machines illustrated in FIGS. 5 to 9 are particularly suitable for introducing effectively into the soil with a minimum amount of power, in a single run growth stimulating substances or insecticides and herbicides together with seed without the need for previously plowing and harrowing the soil in the conventional manner.

With the aid of the specially constructed tools 62 and also by the forwardly inclined position of the rotary axes of the cultivating members 63 a furrow for receiving the seeds can be effectively made in the soil. The wings 56 on the sleeve 55 prevent winding on of weeds and plant parts.

If desired, the spur wheel transmission 77 may be constructed as a change-speed gear.

The invention is not limited to the foregoing statements but also encompasses all details of the figure whether described or not described.

I claim:

1. A soil cultivating machine comprising a frame and a plurality of cultivating members rotatably mounted on said frame, driving means connected to rotate said members, each cultivating member comprising an upwardly extending shaft and said member being rotatable about an axis defined by said shaft, said shaft being inclined forwardly with reference to the normal direction of machine travel and said member comprising a plate-shaped tine that tapers towards a lower free end, said tine having straight side edges and an S-shaped cross-section for substantially the entire length thereof, with the center of said tine being a substantially straight part, the center parts of neighboring members being offset with respect to one another and said members being positioned to cooperate with one another and work a single broad strip of soil.

2. A soil cultivating machine as claimed in claim 1, wherein a driving gear on the shaft of each member are in driving engagement with one another and the shaft of one member is engaged by a change-speed gear to a driving shaft that is directly connectable to the power take-off shaft of a tractor.

3. A soil cultivating machine as claimed in claim 2, wherein there are four wings positioned cross-wise on said sleeve when viewed in plan.

4. A soil cultivating machine as claimed in claim 1, wherein said center part is integral with forwardly bent-over sides of said tine, said sides extending in the normal direction of rotation of said member.

5. A soil cultivating machine as claimed in claim 4, wherein a supporting roller is connected to the frame and positioned to the rear of said row, means setting said roller in a plurality of positions with respect to the frame portion to adjust the working level of the members, said roller being located directly above the lower free ends of the tines of said members.

6. A soil cultivating machine as claimed in claim 4, wherein said tine has a fastening portion which extends substantially at right angles to the longitudinal center line of the tine and said portion being bolted to the lower part of said shaft.

7. A soil cultivating machine as claimed in claim 6, wherein said shaft is supported by spaced apart bearings in a respective housing, said bearings and housing being located within a said hollow frame portion and said housings being fastened to walls of the frame portion by outer bolts.

8. A soil cultivating machine as claimed in claim 7, wherein said frame portion is formed by two identical U-shaped parts of profiled sheet material.

9. A soil cultivating machine as claimed in claim 4, wherein the distance between the shafts of two neighboring members exceeds one third of the diameter of the path described by their elements.

10. A coil cultivating machine as claimed in claim 9, wherein the distance between the shafts of two neighboring cultivating members is about 15 cms and said shafts extend at an angle between 30° to 40° to the horizontal.

* * * * *